United States Patent [19]

Mount

[11] 4,237,698
[45] Dec. 9, 1980

[54] MOTOR COOLING SYSTEM FOR REFRIGERATION MACHINE

[75] Inventor: Gordon L. Mount, West Monroe, N.Y.

[73] Assignee: Carrier Corporation, Syracuse, N.Y.

[21] Appl. No.: 66,966

[22] Filed: Aug. 16, 1979

[51] Int. Cl.³ ............................................. F25B 41/00
[52] U.S. Cl. ........................................ 62/197; 62/505
[58] Field of Search ................................ 62/197, 505

[56] References Cited

U.S. PATENT DOCUMENTS

| | | | |
|---|---|---|---|
| 3,112,618 | 12/1963 | Weller | 62/505 |
| 3,416,327 | 12/1968 | Akerhielm et al. | 62/505 |
| 3,635,041 | 1/1972 | Endress et al. | 62/196 |
| 3,665,724 | 5/1972 | Anderson et al. | 62/196 |

*Primary Examiner*—Ronald C. Capossela
*Attorney, Agent, or Firm*—J. Raymond Curtin; Donald F. Daley

[57] ABSTRACT

Motor cooling system for refrigeration machine wherein one condenser connected to a main stage of the compressor is used to satisfy the cooling requirements of the system and a second condenser connected to a subsequent higher pressure compressor stage is employed for heating a medium to satisfy heating requirements of the system. The motor cooling system contains a three-way selector valve which connects either condenser selectively to the motor housing in response to the pressure in one condenser exceeding the pressure in the other condenser to provide a sufficient liquid refrigerant to the motor for cooling motor components under all operating conditions. The selector valve comprises a horizontally extending tubular portion having an annular seat at each end of the portion and a vertically extending tubular portion attached thereon. An axially movable ball is arranged in a horizontal portion to open selectively either seat and close selectively the opposite seat in response to the refrigerant pressure acting on the ball.

5 Claims, 3 Drawing Figures

MOTOR COOLING SYSTEM FOR REFRIGERATION MACHINE

BACKGROUND OF THE INVENTION

1. Field of the Invention

The invention relates to refrigeration systems employing refrigerant cooled compressor motors wherein liquid refrigerant is introduced into the rotor-stator gap of the motor casing thus providing cooling of the motor. More particularly, the invention pertains to a motor cooling system having a high pressure selector valve to regulate the liquid refrigerant flow to the motor casing.

2. Description of the Prior Art

An air conditioning system of the type under consideration includes a motor driven multistage compressor, an evaporator, a first condenser connected to the first stage of the compressor, and a second heating condenser connected to a subsequent compressor stage. These arrangements are employed in air conditioning systems to provide simultaneously cooling to one portion of a building and heating to another portion of the building. If the system is required to satisfy a cooling load, the vapor refrigerant discharged from the first compressor stage is passed to the first condenser wherein it is converted to a liquid and is then passed to an evaporator or cooler. If the system requires heating, the vapor refrigerant discharged from the second stage of the compressor is passed to a second condenser which serves as a heat exchanger and rejects heat to a coolant. An impeller for the compressor is rotated by the electric motor and liquid refrigerant from the refrigeration system is used as the cooling medium for the motor. High pressure refrigerant liquid from the condenser is introduced into the casing of the motor where it absorbs heat from the motor components.

In the above-described installations there are conditions when the cooling load drastically decreases but heating demand is high. In this situation the cooling condenser will not reject the heat and no, or little, refrigerant will be condensed in the first condenser. At this time all the refrigerant will be fed into the second stage of the compressor and directed to the heating condenser. In these conditions no liquid refrigerant is available from the first condenser to maintain the required cooling refrigerant flow to the motor. Therefore, the motor cooling refrigerant must be supplied from the second or heating condenser and it must be supplied automatically.

SUMMARY OF THE INVENTION

An object of this invention is to provide an improved arrangement for cooling the motor of a motor-compressor unit in a refrigeration system of the type wherein a multistage compressor, a cooler, a tower condenser and a heating condenser are employed to satisfy both heating and cooling requirements.

Another object of the invention is to provide an arrangement for cooling the motor of the compressor which ensures sufficient liquid refrigerant flow to the motor under substantially all system loading conditions.

Still another object of the invention is to provide an automatic selector valve in a motor cooling circuit of a refrigeration system to regulate the liquid refrigerant flow in a motor cooling supply line from either of two condensers.

A still further object of the invention is to provide an improved selector valve which is tolerant to contaminants in the refrigerant and is not clogged by foreign material in the system.

Still another object of the invention is to provide an automatic selector valve structure which is simple and easy to manufacture.

These and other objects of this invention are attained by automatic flow control means arranged in the motor cooling circuit to connect the compressor motor selectively with the tower condenser or the heating condenser of the refrigeration system. A three-way selector valve is provided in the motor cooling circuit including a body having a horizontally extending tubular portion to provide a passage for refrigerant flow and a vertically extending tubular portion with an outlet for refrigerant, a pair of seats arranged at each end of the horizontally extending portion to provide inlets for refrigerant, and a spheroid adapted for axial movement within the horizontally extending portion by the flow of refrigerant at relatively high pressure and arranged to engage each seat selectively to block the refrigerant flow therethrough.

DETAILED DESCRIPTION OF THE PREFERRED EMBODIMENT

Figure 1:
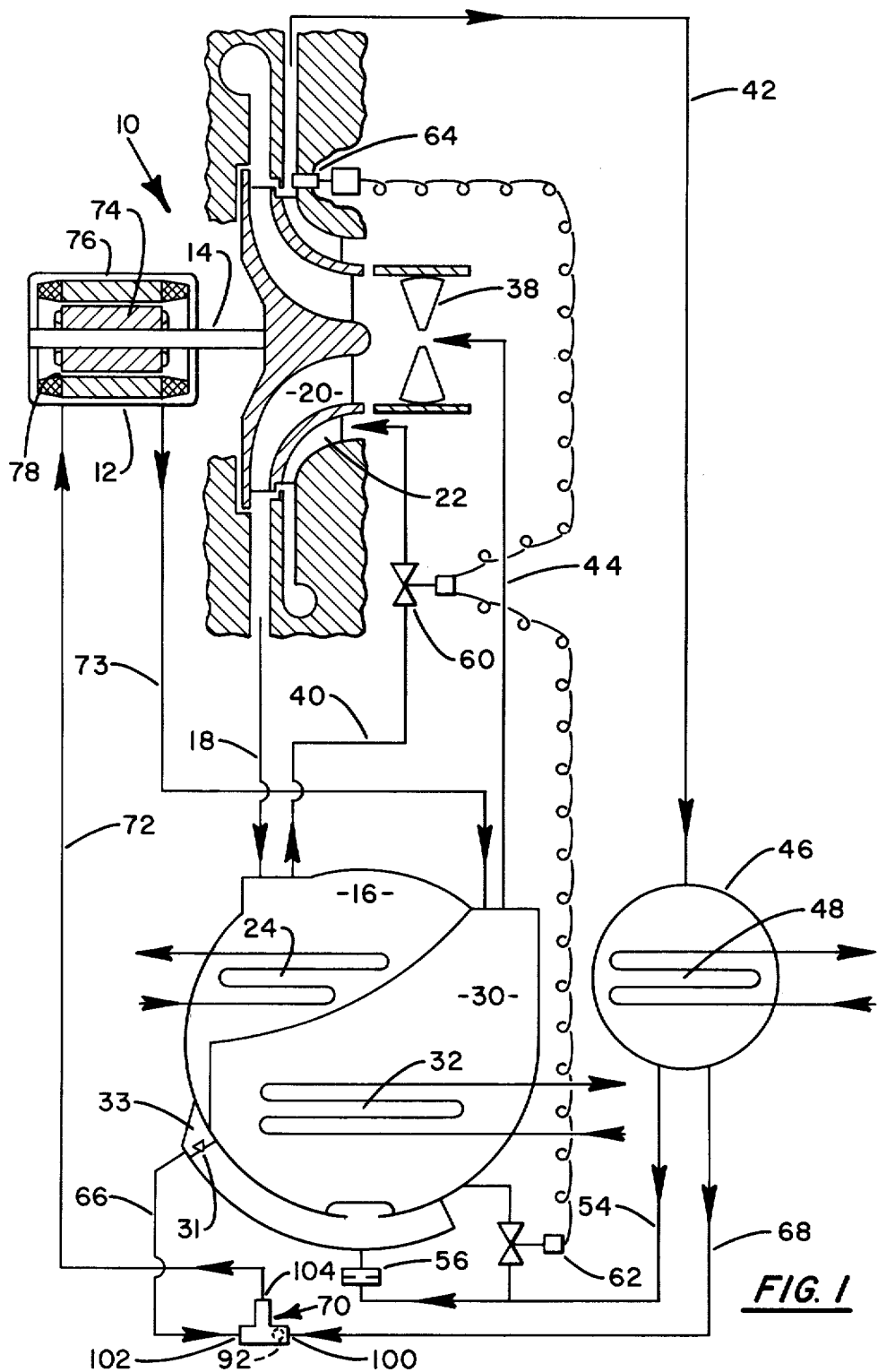
FIG. 1 is a schematic view of a refrigeration system incorporating a motor cooling refrigerant circuit in accordance with the present invention and showing the compressor motor in a sectional view.

Referring to FIG. 1, the refrigeration system shown therein includes a compressor 10 of the two-stage centrifugal type. Compressor 10 is driven by electrical motor 12, connected to the compressor by shaft 14. Discharge line 18 connects the compressor with a condenser 16 for the passage of refrigerant thereto. The refrigerant is discharged from the first stage 20 to the condenser 16. Condenser 16 includes a tube bundle or tubing 24 supplied with cooling medium such as water from outdoor water tower or any other source of cooling medium. Liquid refrigerant from condenser 16 is fed to an evaporator or cooler 30 from whence it is discharged as a vapor into a suction line 44. A float control metering valve 31 is arranged in float chamber 33 to regulate the flow of liquid refrigerant from the condenser 16 to cooler 30 in a conventional manner. The compressor is provided with capacity control means such as inlet guide vanes 38 for regulating the evaporated refrigerant from the suction line 44 into the compressor. Evaporator 30 includes a tubing or tube bundle 32 for passage therethrough of chilled water. A refrigerant vapor line 40 extends from the vapor area of condenser 16 to the inlet of the second stage 22 of the compressor. In operation all of the vapor refrigerant goes through the main stage 20 into the tower condenser 16. From there, that portion of the refrigerant needed to satisfy the heating load flows through the second stage 22, wherein it is compressed to a higher pressure and then passes through a line 42 into a heating condenser 46. The heating condenser 46 contains a tube bundle 48 for passage therethrough of heating water. To provide flow control of refrigerant vapor from the condenser to the second stage of the compressor in accordance with various cooling and heating requirements, a flow controlling member or a damper valve 60 is assembled in line 40. The second stage 22 of the compressor is provided with a control valve such as a diffuser sleeve valve 64 to control the amount of refrigerant flow from the high pressure stage to the heating condenser 46. Valve 64 is movable across the diffuser passage to control the refrigerant flow through the heating circuit of the system. The heating condenser 46 is connected through a line 54 to cooler 30 and through a second outlet line 68 to a selector valve 70 which connects the heating condenser 46 with a motor cooling circuit. A standard solenoid valve 62 in the line 54 provides a bypass passage to cooler 30 when the machine is switched to the cooling only mode of operation. A fixed orifice 56 is arranged in the heating refrigerant circuit to provide a pressure drop from the heating condenser 46 to cooler 30. A line 66 extends from condenser 16 to the inlet of the selector valve 70 to provide a passage of cooling liquid refrigerant to the motor. The motor cooling circuit also includes a conduit line 72 leading to the motor and a drain line 73 for vapor refrigerant discharged from the motor after motor cooling to evaporator 30. Preferably, drain line 73 has a greater diameter than the diameter of the conduit line 72 because the refrigerant in the vapor state discharged from the motor is of a greater volume than liquid refrigerant. Motor 12 is of a usual structure having a rotor member 74 and a stator member 76 mounted on the drive shaft 14. A number of axially extending openings 78 are formed in the motor to provide passages for the flow of cooling refrigerant.

Figure 2:
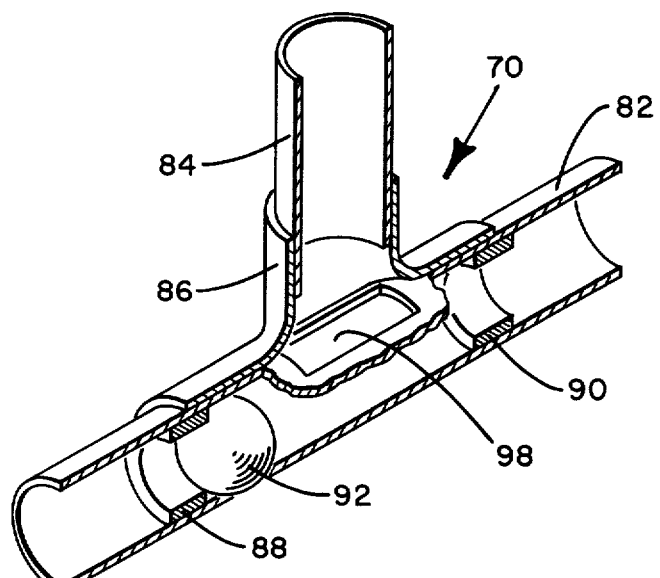
FIG. 2 is an isometric view with portions broken away of a selector valve showing the valve in blocked condition.
Figure 3:
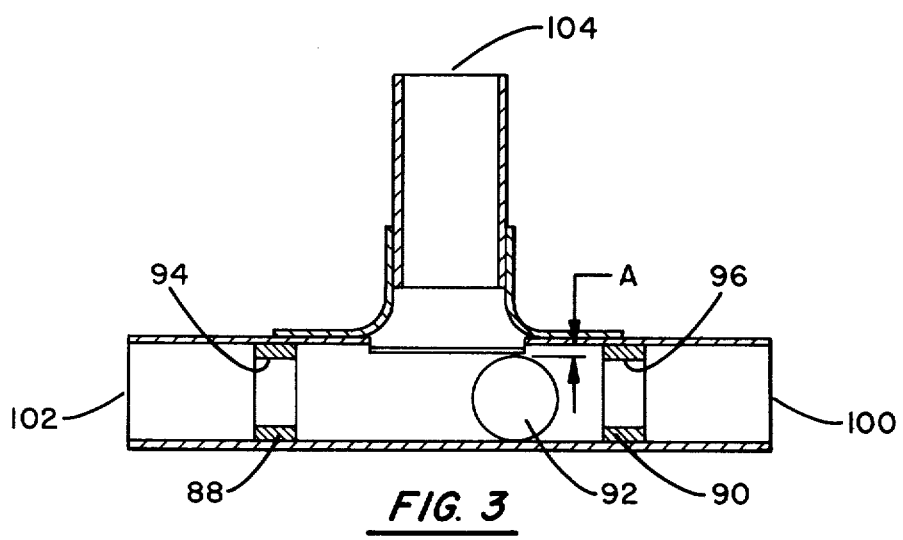
FIG. 3 is a sectional view of the selector valve showing the valve in unblocked condition.

Referring to FIGS. 2 and 3, a three-way selector valve 70 includes a horizontally extending portion 82 insertable into a pipeline which is in communication with the motor cooling circuit, shown in FIG. 1. A horizontally extending tubular portion forms a straight-run passage to provide a fluid flow path for refrigerant. A vertically upwardly extending tubular portion 84 is connected to portion 82 substantially at the middle thereof. Portion 84 is attached to portion 82 by an annular member 86 which may be welded or otherwise rigidly secured to portions 82 and 84. Portion 82 is substantially a hollow pipe in shape and constructed for receiving a plug typically in the form of a spheroid or ball 92. Two side ports 100 and 102, on each side of horizontal portion 82, provide inlets for connection into tubing of refrigerant lines 66 and 68 shown in FIG. 1. Vertical portion 84 forms a straight-through passage for refrigerant and provides an outlet 104 for refrigerant flow. Outlet 104 is connected to refrigerant line 72 shown in FIG. 1. It should be noted that each of three ends of the valve may be welded to the pipeline connections or may be threaded or may be provided with flanges (not shown) for bolting the valve in the pipeline in a normal manner. Two seats 88 and 90 are mounted within the straight run portion 82. These seats have internal openings 94 and 96 respectively, to receive the ball 92. Ball 92 is positioned between two seats and is axially movable forward and rearward within portion 82 by the flow of fluid through the length of portion 82. Spheroid or ball 92 is made of metal or any other suitable material. An outer cross sectional area of ball 92 is greater than the inner cross sectional area of the internal opening of each seat. This assures a relatively tight engagement between the ball and the seat to efficiently close either inlet. A slot 98 is formed at the upper side of the portion 82 where vertically extending portion 84 is connected to portion 82. This slot prevents the ball from moving into the vertical portion 84. Selector valve 70 is arranged in the refrigeration circuit to open selectively inlet 100 or 102 in order to provide a flow of cooling liquid refrigerant from tower condenser 16 or heating condenser 46 selectively to the compressor motor. The operation of the valve will be explained below.

It should be noted that refrigerant passing through the refrigeration equipment may contain some contaminants such as lubricant and dirt particles. The dirt particles may prevent the ball 92 from freely moving within the portion 82 when the refrigerant flow is passing through the valve. The spheroid configuration of the plug 92 provides clearance marked as "A" in FIG. 3 between the ball and the walls of horizontal portion 82 during the axial movement of the ball. This clearance would allow the commonly occurring dirt in the refrigeration circuit to pass through the valve thereby providing the free axial movement of the ball without being stuck in the tubular body of the valve.

In the refrigeration systems under consideration only that amount of energy necessary for satisfying the heating load is taken to the higher temperature and pressure level required for rejecting heat to the heating water. The remainder of the energy is rejected to the tower water at normal conditions. All the refrigerant gas goes through the main stage 20 into tower condenser 16. From there, that portion of the refrigerant needed to satisfy the heating load goes through the second stage 22 and into heating condenser 46. The capacity of the main or first stage 20 is controlled in response to leaving chilled water temperature in the tubing bundle 24. The capacity of the second or higher pressure stage 22 is controlled in response to leaving hot water temperature in the tubing bundle 48.

In operation, when the requirements for chilled water in the refrigeration system are increased but the heating requirement is very small, a refrigerant vapor is discharged from the first stage 20 of the compressor into tower condenser 16 wherein it is liquefied in heat transfer relation with cooling water in the tubing bundle 24. The liquid refrigerant discharged from the tower condenser empties into the float chamber 33, from where it is conveyed to cooler 30 in a normal manner. The flow of refrigerant from the tower condenser into the cooler is regulated by the float valve 31. From the cooler 30 a vapor refrigerant formed in heat transfer relation with the water in the tubing bundle 32 is discharged through suction line 44 into the guide vanes 38 of the compressor thus completing the circuit. As can be observed in FIG. 1, the flow controlling member 60 is electrically connected with diffuser sleeve valve 64 and with solenoid valve 62 to regulate the refrigerant flow through the heating refrigerant circuit. The damper valve 60 and diffuser sleeve valve 64 are arranged in circuit to be movable between open and closed positions in proportion to the heat load on the tubing bundle 48. If the temperature of the leaving heating water in the tubing bundle 48 indicates that heating demand is very small, the damper valve 60 and the diffuser valve 64 are moved toward the closed position. A small amount of vapor from the tower condenser is leaking through line 40 into the second stage 22 where it is compressed and is then conveyed through line 42 to the heating condenser 46. From condenser 46 leaking refrigerant flows into lines 54 and 68. At this time the vent solenoid valve 62 electrically connected to the damper valve 60 is opened and allows the leaking refrigerant to be bypassed directly to cooler 30. A very small amount of refrigerant discharged into the motor cooling line 68 is at relatively low pressure. In order to reach all hot spots in the motor during the motor cooling, the refrigerant should be fed through the compressor motor at a relatively high pressure. Pressure in line 68 and refrigerant flow in line 68 are not sufficient to provide an adequate refrigerant flow through the motor cooling circuit. At this time a portion of high pressure liquid refrigerant from tower condenser 16 is discharged to line 66 and directed to the port 102 of the selector valve 70. Due to reduction of the pressure in line 68, ball 92 is moved by the high pressure liquid flow from port 102 in direction to port 100, opens seat 88 and closes seat 90 in the valve body. With the ball 92 moved to uncover port 102 the flow passage is continuous through port 104 and line 72 extending to the motor 12. It is understood that to provide the ball 92 to be moved in direction to open port 102, the pressure in the tower condenser 16 applied to valve 70 through line 66 must be in excess of the pressure applied against the opposite side of valve 70.

Cooling liquid refrigerant formed in the tower condenser 16 flows through valve 70 and line 72 to the interior of the housing of the motor. Liquid refrigerant is introduced into the motor casing to be distributed into each opening 78 thus providing highly efficient cooling of the rotor and stator. After refrigerant has passed through the passages 78 in the motor housing, it is completely vaporized as it absorbs heat radiating from the motor components and is fed into drain line 73, from whence it is discharged back to the condenser. It will be apparent that the vapor refrigerant warmed by passage in heat transfer relation to the motor components is reintroduced into the refrigeration machine.

At excessively high heating requirements, as the cooler load decreases, there will be no heat rejected in the tower condenser and the second stage 22 will call for all vapor refrigerant that is available from the first stage discharge. As the cooler load decreases, the guide vanes 38 move toward the closed position. At this time damper valve 60 and diffuser valve 64 are open and all of the flow will be discharged from the first stage 20 through line 18, condenser 16 into the second stage 22, wherein it will be compressed to a higher pressure and then directed to the heating condenser 46. Under these conditions tower condenser pressure might drop so that no condensed refrigerant or very small amount of refrigerant will be available for cooling purposes. The refrigerant pressure and flow of refrigerant in line 66 will be insufficient to provide a proper flow of cooling refrigerant to the motor casing. At this time in heating condenser 46 vapor refrigerant is converted to a high pressure liquid refrigerant in heat transfer relation with water in tubing bundle 48. The condensing temperature in the heating condenser 46 increases and accordingly the pressure in condenser 46. The condensed refrigerant will flow from condenser 46 through line 54 and orifice 56 to cooler 30 in a normal manner. A portion of liquid refrigerant will be discharged into line 68. At this time pressure in line 68 exceeds refrigerant pressure in line 66. The ball 92 of valve 70 is moved to close port 102 and open port 100 under pressure acting against pressure on port 102. The high pressure liquid refrigerant flowing through ports 100 and 104 is fed into line 72 and motor housing 12 wherein the refrigerant is evaporated in heat transfer relation with the stator and rotor and then returned in a gaseous state to the evaporator 30.

When a low heating load is required but a cooling demand is still high, the refrigeration machine is cycling in and out providing a certain amount of refrigerant from the tower condenser 16 into the second stage 22 wherein it is compressed to a higher pressure and directed to the heating condenser 46. When the temperature of the leaving hot water reaches the set point, the machine switches to the cooling only. It will operate in this mode for a while until the leaving hot water thermostat is calling for more heat. The machine is then switched on the heating mode. At this time damper valve 60 and diffuser valve 64 open and close lines 40 and 42 in accordance with the heating or cooling demands. Selector valve 70 at this mode of operation cyclically connects lines 66 or 68 with line 72 in response to a higher pressure which acts against the ball 92 to supply liquid refrigerant to the motor housing.

As can be seen, movement of the ball 92 in selector valve 70 occurs in response to pressure differences in the tower condenser and in the heating condenser, which provide a constant flow of liquid refrigerant to motor casing regardless of operating conditions. It will be apparent that liquid refrigerant is continuously supplied to the interior of the casing through line 72 during all operating conditions.

While this invention has been illustrated in accordance with a preferred embodiment it is recognized that variations and changes may be therein without departing from the invention as set forth in the claims.

I claim:

1. A compressor motor cooling circuit in a refrigeration system of the type comprising a multistage compressor driven by a motor, an evaporator, a first condenser connected to the first compressor stage to provide liquid refrigerant to the evaporator for cooling requirements of the system, a second condenser connected to a subsequent higher pressure stage of the compressor to reject heat to a coolant for heating requirements of the system, the motor cooling circuit including
a liquid refrigerant supply line connecting the high pressure side of the system and the compressor motor to provide liquid refrigerant thereto,
a conduit line to return the refrigerant to the refrigeration system after motor cooling, and
regulating means arranged in said liquid refrigerant supply line to connect selectively said compressor motor with the first condenser or the second condenser,
said regulating means being responsive to a relationship between the pressure in the first condenser and the pressure in the second condenser and adapted to connect said motor with a higher pressure liquid refrigerant source thereby providing sufficient liquid refrigerant flow irrespective of refrigeration machine operating conditions.

2. The compressor motor cooling circuit in accordance with claim 1, wherein said regulating means include a three-way selector valve.

3. The compressor motor cooling circuit of claim 2 wherein the selector valve arranged comprises:
a body having a horizontally extending tubular portion and an upwardly extending tubular portion at substantially the middle thereof to provide passage for refrigerant flow leaving the valve,
seats positioned at each end of the horizontally extending portion to provide two inlets for refrigerant flow entering the valve, a plug carried within the horizontally extending portion for reversible axial movement within said portion, said plug being arranged to engage selectively either seat to block the refrigerant flow therethrough and permit refrigerant flow at a relatively higher pressure through the opposite seat to the outlet of the valve.

4. The selector valve in accordance with claim 3, wherein said plug is a spheroid of smaller diameter than the tubular portion to provide a substantial clearance between the plug and the walls of the horizontally extending tubular portion to prevent interference of the spheroid within said horizontally extending portion by the contaminants in the refrigerant during the movement of the spheroid.

5. The selector valve in accordance with claim 4, wherein a rectangular slot is formed in said horizontally extending portion at the connection with said vertically extending portion thereof to prevent said spheroid from moving into the vertically extending portion.

* * * * *